(12) United States Patent
Magaribuchi

(10) Patent No.: US 6,626,055 B2
(45) Date of Patent: Sep. 30, 2003

(54) RACK AND PINION TYPE SWING ACTUATOR

(75) Inventor: Mitsunori Magaribuchi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/813,216

(22) Filed: Mar. 21, 2001

(65) Prior Publication Data

US 2001/0029796 A1 Oct. 18, 2001

(30) Foreign Application Priority Data

Apr. 12, 2000 (JP) ........................................ 2000-110673

(51) Int. Cl.[7] ......................... F15B 15/06; F15B 15/24; F16H 19/04; F16H 55/28
(52) U.S. Cl. ........................... 74/89.17; 91/394; 92/136; 74/89.19; 74/435
(58) Field of Search ..................... 74/89.17, 89.29, 74/10.85, 10.6, 10.39, 109, 409, 722, 842, 29–35, 825, 89.37, 440, 89.42, 730.1, 120, 121, 130–135, 89.19, 435, 441, 89.11, 89.12; 92/136, 13.7, 75, 69 R, 13.1, 111, 138, 153, 181 R, 85 B, 85 R; 91/409, 290, 219, 329, 394; 60/591

(56) References Cited

U.S. PATENT DOCUMENTS

| | | | | |
|---|---|---|---|---|
| 185,521 A | * | 12/1876 | Gregersen | |
| 1,770,250 A | * | 7/1930 | Norton | |
| 2,334,383 A | * | 11/1943 | Carr et al. | |
| 2,844,128 A | * | 7/1958 | Steiner | |
| 3,179,015 A | * | 4/1965 | Kurt | |
| 3,288,035 A | * | 11/1966 | Ryzner | |
| 3,447,423 A | * | 6/1969 | Henry | |
| 3,537,358 A | * | 11/1970 | Bunyard | 92/136 |
| 3,628,426 A | * | 12/1971 | Frach et al. | |
| 4,281,588 A | * | 8/1981 | Jaske | 92/136 |
| 4,651,627 A | * | 3/1987 | Stewart | 92/136 |
| 5,189,923 A | * | 3/1993 | Lashbrook | 74/409 |
| 5,560,282 A | * | 10/1996 | Trenner et al. | 92/136 |
| 6,435,072 B2 | * | 8/2002 | Hirano et al. | 91/394 |
| 6,474,214 B2 | * | 11/2002 | Takeuchi et al. | |
| 2001/0020413 A1 | * | 9/2001 | Hirano et al. | 91/409 |
| 2001/0029796 A1 | * | 10/2001 | Magaribuchi | 74/89.17 |
| 2002/0152826 A1 | * | 10/2002 | Mitsu et al. | 74/422 |
| 2003/0041598 A1 | * | 3/2003 | Takeuchi et al. | 60/591 |

FOREIGN PATENT DOCUMENTS

| | | | |
|---|---|---|---|
| GB | 2102887 | * | 2/1983 |
| JP | 55-97504 | * | 7/1980 |
| JP | 62137402 | * | 6/1987 |
| JP | 4325706 | * | 11/1992 |
| JP | 5-79504 | * | 3/1993 |
| JP | 295907 | * | 10/2001 |

* cited by examiner

*Primary Examiner*—Douglas C. Butler
(74) *Attorney, Agent, or Firm*—Oblon, Spivak, McClelland, Maier & Neustadt, P.C.

(57) ABSTRACT

A rack and a pinion respectively have stoppers constituted by a flat surface in both sides of tooth portions thereof. The stopper of the pinion is brought into contact with the stopper of the rack at both oscillating stroke ends of the rack, whereby a backlash is absorbed.

2 Claims, 2 Drawing Sheets

RACK AND PINION TYPE SWING ACTUATOR

TECHNICAL FIELD

The present invention relates to a rack and pinion type swing actuator with a backlash absorbing mechanism, and more particularly to a single rack type swing actuator which absorbs a backlash in an engaging portion between a rack and a pinion so as to remove a play in a rotational direction of the pinion.

PRIOR ART

Conventionally, there has been generally known a structure shown in FIGS. 4 and 5 as a backlash absorbing mechanism of this kind of rack and pinion type swing actuator.

FIG. 4 shows an embodiment of a backlash absorbing mechanism in a single rack type swing actuator having one rack. In this embodiment, a tooth portion 1a of a rack 1 and a tooth portion 2a of a pinion 2 are engaged with each other, and one end portion of an arm 5 synchronously rotating with the pinion 2 is fixed to the pinion 2. Accordingly, the structure is made such that a backlash in the engaging portion between the rack 1 and the pinion 2 is absorbed by bringing another end of the arm 5 mentioned above into contact with a stopper 4 so as to stop a rotation of the pinion 2 in a state of applying a propelling force in one direction to the rack 1 at an oscillating stroke end of the rack 1, whereby a play in a rotational direction of the pinion 2 is removed.

Further, FIG. 5 shows an embodiment of a backlash absorbing mechanism in a double rack type swing actuator having two racks. In this embodiment, a pair of racks 1 and 3 are arranged so as to hold the pinion 2 therebetween, tooth portions 1a and 3a of both of the racks 1 and 3 and a tooth portion 2a of the pinion 2 are engaged with each other, and the structure is made such that a backlash in the engaging portion between the rack 1 and the pinion 2 is absorbed by bringing one end of the rack 3 into contact with the stopper 4 so as to stop a rotation of the pinion 2 in a state of applying a propelling force in one direction to the rack 1 at a stroke end of the racks 1 and 3, whereby a play in a rotational direction of the pinion 2 is removed.

In this case, as mentioned above, in the case of the double rack type swing actuator, the backlash can be absorbed by the comparatively simple structure, however, in the case of the single rack type, since the arm 5 is fixed to the pinion 12 and the stopper 4 is used for stopping the rotation of the pinion 2, an outer size of the backlash absorbing mechanism is increased, the swing actuator is not well received, and the arm 5 is operated in a state of being protruded to an outer portion from the actuator, so that there are problems that a danger is generated and a safety can not be secured.

DISCLOSURE OF THE INVENTION

The present invention is made by taking the problems mentioned above into consideration, an object of the present invention is to provide a single rack type rack and pinion type swing actuator which can absorb a backlash in an engaging portion between a rack and a pinion by a simple structure and can remove a play in a rotational direction of the pinion.

In order to achieve the object mentioned above, in accordance with the present invention, there is provided a rack and pinion type rotary actuator comprising: a cylinder hole provided in a casing; end blocks closing both ends of the cylinder hole; one rack having pistons at both ends and sliding within the cylinder hole in accordance with an operation of a fluid pressure; a pinion rotating in a state of being engaged with the rack; pressure chambers respectively formed between the pistons at both ends of the rack and the end blocks; and ports for supplying a pressure fluid to the respective pressure chambers, wherein at least one of the rack and the pinion has stoppers in both sides of a tooth portion, the rack and the pinion has a relation that the rack and the pinion are engaged with each other by the stopper at both oscillating stroke ends of the rack, and the rack and each of the end blocks have a relation that the rack and each of the end blocks are not brought into contact with each other at the stroke end of the rack.

In the swing actuator in accordance with the present invention having the structure mentioned above, the rack and the pinion stop in a state of being engaged with each other by the stopper at the stroke end of the rack, whereby the pinion is prevented from being rotated. That is, a backlash in the engaging portion between the pinion and the rack is absorbed.

In accordance with a particular embodiment of the present invention, at least pinion of the rack and the pinion has the stopper, the pinion has the tooth portion having a plurality of teeth formed therein and a round portion having no teeth, and the stoppers are formed at positions adjacent to the tooth portions at both ends of the round portion.

In this case, preferably, an addendum circle in the tooth portion of the pinion and the round portion have the same radius, and the stopper is a flat surface inclined with respect to a radius of the round portion. Further, it is desirable to structure such that the rack has stoppers formed by a flat surface in both sides of the tooth portion, the rack and the pinion have the same number of teeth, and the stoppers of the rack and the stoppers of the pinion are in surface contact with each other at both stroke ends of the rack, respectively.

In accordance with another embodiment of the present invention, the rack has the stoppers in both sides of the tooth portion, and the pinion has the tooth portion in a whole periphery, whereby the rack and the pinion have a relation that the teeth of the pinion are engaged with the stopper at the stroke end of the rack.

DETAILED DESCRIPTION

Figure 1:
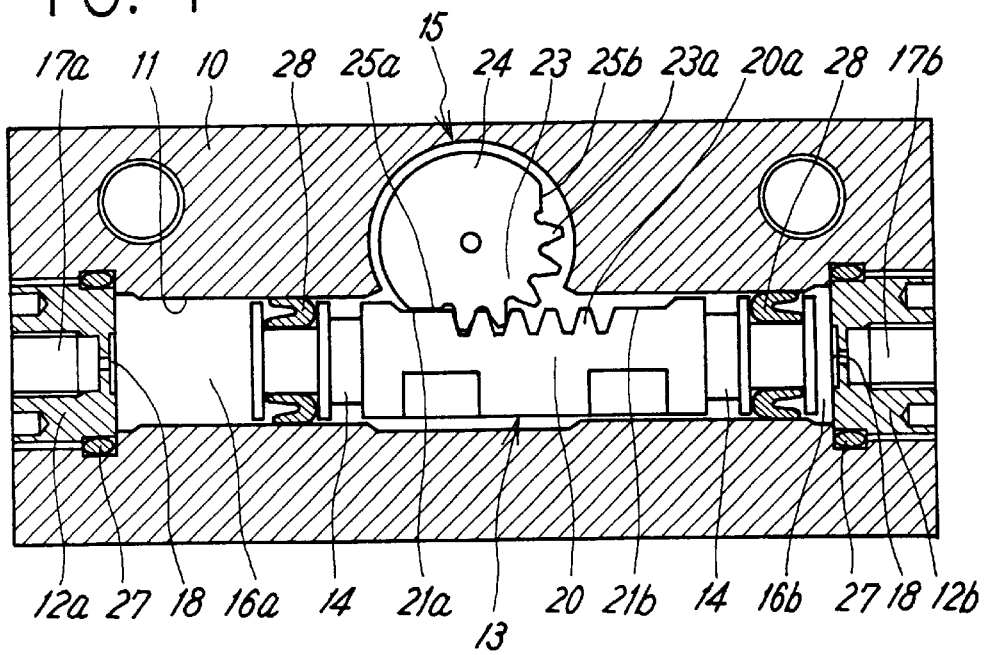
FIG. 1 is a cross sectional view showing an embodiment of a rack and pinion type swing actuator in accordance with the present invention.

A description will be in detail given below of embodiments in accordance with the present invention with reference to the accompanying drawings. At a time of describing the embodiments, the same reference numerals are attached to the elements having the same functions.

FIG. 1 shows a rack and pinion type swing actuator provided with a backlash absorbing mechanism. This rack and pinion type swing actuator is of a single rack type having one rack. This actuator has a casing 10, and this casing 10 is provided with one cylinder hole 11 extending through an inner portion of the casing, first and second end blocks 12a and 12b closing both ends of the cylinder hole 11, one rack 13 sliding in an oscillating manner within the cylinder 11 by pistons 14 and 14 at both ends, a pinion 15 engaged with the rack 13 so as to swing and rotate, first and second pressure chambers 16a and 16b respectively formed between the pistons 14 and 14 at both ends of the rack 13 and end blocks 12a and 12b, and first and second ports 17a and 17b for supplying a pressure fluid to the respective pressure chambers 16a and 16b. A main axis (not shown) is mounted to the pinion 15 so as to swing and rotate together with the pinion 15.

The ports 17a and 17b are respectively provided in the end blocks 12a and 12b closing both ends of the cylinder hole 11 one by one, and are communicated with the respective pressure chambers 16a and 16b through openings 18, and the rack 13 oscillates within the cylinder hole 11 by alternately supplying the pressure fluid to each of the pressure chambers 16a and 16b from the ports 17a and 17b, so that the pinion 15 engaged with the rack 13 and the main axis fixed to the pinion 15 swing and rotated in an oscillating manner.

A tooth portion 20 provided with a plurality of teeth 20a is formed on a side surface of the rack 13, first and second stoppers 21a and 21b are provided in both ends of the tooth portion 20, and these stoppers 21a and 21b are formed by a flat surface having the same height as that of an edge surface of the tooth portion 20.

On the contrary, the pinion 15 has a tooth portion 23 in which a plurality of teeth 23a are formed in a part of a circumference, and the other portions of the circumference are formed as a round portion 24 having no teeth. The addendum circle in the tooth portion 23 and the round portion 24 are formed so as to have the same radius, and at positions adjacent to the tooth portion 23 of both ends of the round portion 24, first and second stoppers 25a and 25b constituted by a flat surface inclined to a radius of the round portion 24 drawn at the positions are formed.

Then, the rack 13 and the pinion 15 are engaged with each other by the tooth portions 20 and 23, and have a relation that the respective stoppers 21a and 21b, 25a and 25b are engaged with each other at both oscillating stroke ends of the rack 13. In this case, the stoppers 21a and 25a, and 21b and 25b are respectively in surface contact with each other by making the number of the teeth of the rack 13 and the number of the teeth of the pinion 15 equal to each other. Further, the rack 13 and the respective end blocks 12a and 12b have a relation of being apart from each other with a slight gap without being brought into contact with each other at both oscillating stroke ends of the rack 13.

In this case, reference numeral 27 in FIG. 1 denotes a seal member for keeping an airtight between the end blocks 12a and 12b and an inner peripheral surface of the cylinder hole 11, reference numeral 28 denotes a seal member attached to an outer periphery of each of the pistons 14 and 14 so as to be in slidable contact with the inner peripheral surface of the cylinder hole 11.

In the swing actuator having the structure mentioned above, the rack 13 oscillates within the cylinder hole 11 by alternately supplying the pressure fluid to the respective pressure chambers 16a and 16b from two ports 17a and 17b, and the pinion 15 engaged therewith and the main axis fixed thereto swing and rotate in an oscillating manner. FIG. 1 shows a state that the rack 13 reaches one stroke end by supplying the pressure fluid to the first pressure chamber 16a from the first port 17a. At this time, the first stopper 25a of the pinion 15 is pressed against the first stopper 21a of the rack 13, whereby the rotation of the pinion 15 is restricted, so that a play in an engaging portion between the tooth portion 20 of the rack 13 and the tooth portion 23 of the pinion 15, that is, a backlash is absorbed. Further, the end portion of the rack 13 is not brought into contact with the second end block 12b, and a gap is kept between them, whereby the rack 13 is in a state that a propelling force caused by the fluid pressure is applied to the rack 13 in one direction.

In a reverse manner to that shown in FIG. 1, when supplying the pressure fluid to the second pressure chamber 16b from the second port 17b so as to move the rack 13 to another stroke end, the second stopper 25b of the pinion 15 is pressed against the second stopper 21b of the rack 13, and the backlash is absorbed in the same manner as that in the case of FIG. 1. At this time, the rack 13 stops at a position apart from the first end block 12a, and is in a state that a propelling force is applied toward the first end block 12a side.

It is possible to securely prevent the pinion 15 from rotating and absorb the backlash in the engaging portion between the rack 13 and the pinion 15 by pressing the stoppers 25a and 25b of the pinion 15 against the stoppers 21a and 21b of the rack 13 in a state of applying the propelling force in one direction to the rack 13 at both oscillating stroke ends of the rack 13.

At this time, since it is sufficient that the stoppers 21a and 21b, and 25a and 25b are only provided in the rack 13 and the pinion 15 and it is not necessary that the backlash absorbing mechanism having a large outer size which is conventionally employed is provided, the backlash absorbing mechanism becomes simple and compact. Further, the impact when the pinion 15 stops is received by the stoppers 21a and 21b, and 25a and 25b, whereby a load applied to the tooth portions 20 and 23 can be reduced, and it is possible to prevent the tooth portion from being abraded or broken.

Figure 2:
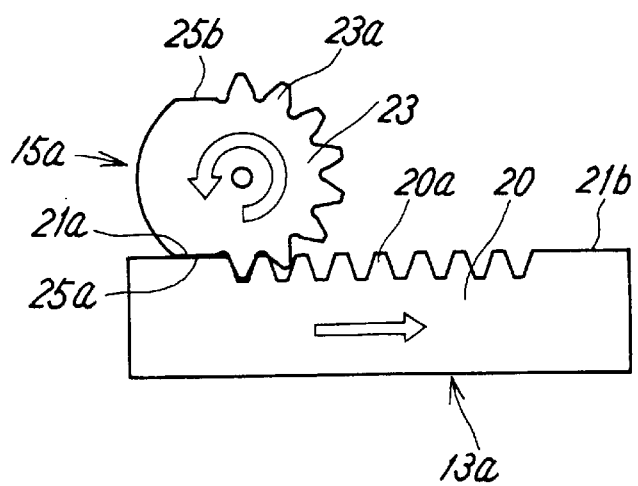
FIG. 2 is a side elevational view showing an example of a rack and a pinion which can absorb a backlash.

FIG. 2 is a schematic view explaining a backlash absorbing principle in accordance with the present invention only with respect to a rack 13a and a pinion 15a. The rack 13a and the pinion 15a are different from the rack 13 and the pinion 15 shown in FIG. 1 in a point that in FIG. 1, the tooth portion 23 of the pinion 15 is formed in a range of circumferential angle equal to or less than 180 degrees, however, in FIG. 2, the tooth portion 23 of the pinion 15a is formed in a range of circumferential angle substantially equal to 180 degrees. Accordingly, in the pinion 15a in FIG. 2, two stoppers 25a and 25b are parallel to each other.

Figure 3:
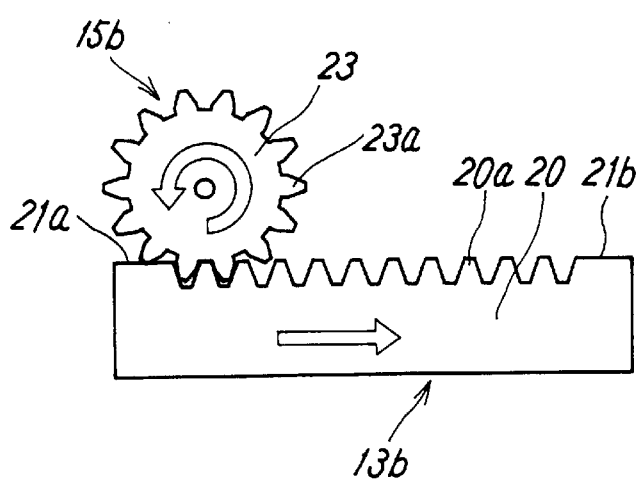
FIG. 3 is a side elevational view showing another example of a rack and a pinion which can absorb a backlash.
Figure 4:
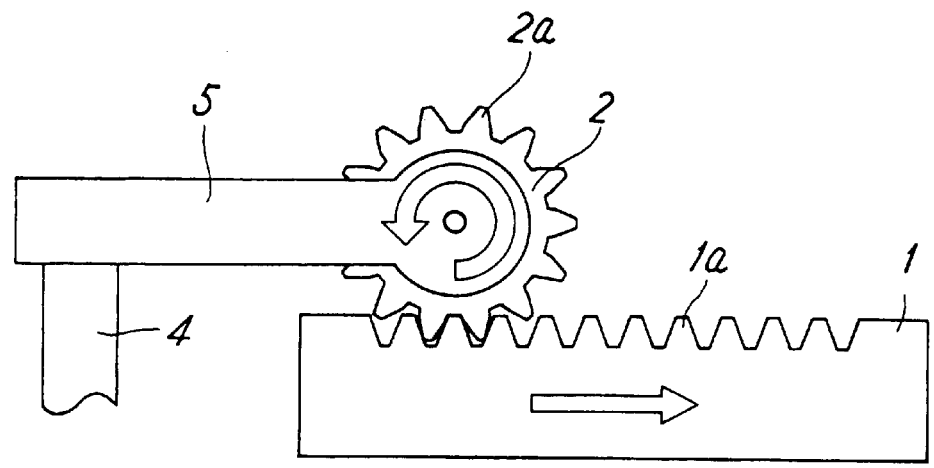
FIG. 4 is a side elevational view showing an example of a backlash absorbing mechanism in accordance with a conventional art.
Figure 5:
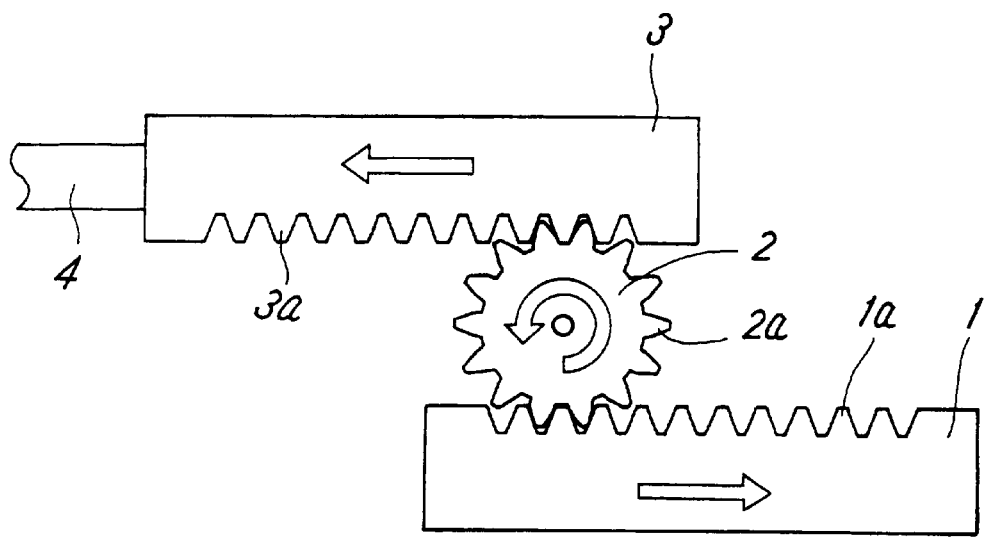
FIG. 5 is a side elevational view showing another example of a backlash absorbing mechanism in accordance with a conventional art.

FIG. 3 is a schematic view explaining a different example of a backlash absorbing mechanism which can be applied to the present invention only with respect to a relation between a rack 13b and a pinion 15b. In this example, the stoppers 21a and 21b constituted by a flat surface are provided in both sides of the tooth portion 20 only in the rack 13b, and the tooth portion 23 is formed in a whole periphery of the pinion 15b. Further, the rack 13b and the pinion 15b have a relation that the teeth 23a of the pinion 15b are engaged with the stoppers 21a and 21b of the rack 13b at the stroke end of the rack 13b.

The structure can be made such that the stopper shown in FIGS. 1 and 2 is provided in only the pinion and no stopper is provided in the rack, in the reverse manner to the case shown in FIG. 3.

Further, in the example shown in FIGS. 1 and 2, the addendum circle of the tooth portion 23 in the pinion 15 or 15a and the round portion 24 are formed so as to have the same radius, however, it is not always necessary that they are the same, the radius of the round portion 24 may be smaller or larger than the radius of the addendum circle. Further, it is not always necessary that the stoppers 25a and 25b of the pinion 15 or 15a and the rack 13 or 13a are constituted by the flat surface. For example, the stoppers 25a and 25b of the pinion 15 or 15a may be constituted by a surface on a circular arc.

As mentioned above, in accordance with the present invention, since the structure is made such that the stopper is provided at least in one of the rack and the pinion, and the rack and the pinion are engaged with each other by the stopper at both oscillating stroke ends of the rack, it is possible to absorb the backlash between the rack and the pinion by the simple and compact structure and it is possible to remove a play in the rotational direction of the pinion.

I claim:

1. A rack and pinion type rotary actuator comprising:

a cylinder hole provided in a casing;

end blocks closing both stroke ends of said cylinder hole;

one rack having pistons at both ends and sliding within said cylinder hole in accordance with an operation of a fluid pressure;

a pinion having a tooth portion having a plurality of teeth formed therein and a round portion having no teeth rotating in a state of being engaged with said rack;

wherein the number of teeth of the pinion and the number of tooth grooves on the rack are the same;

pressure chambers respectively formed between the pistons at both ends of said rack and the end blocks; and ports for supplying a pressure fluid to said respective pressure chambers, wherein the rack and pinion each include a stopper formed by a flat surface on either side of said tooth portion of the pinion and at the stroke ends of the rack, the rack and pinion being engaged with each other by said stopper at both stroke ends of said rack such that the respective stopper of said rack and the respective stopper of said pinion are in surface contact with each other at both stroke ends of said rack, and said rack and the end blocks are not brought into contact with each other;

wherein the stoppers of the pinion are constructed at the surface in which they extend from a groove bottom to the outer periphery of a round portion at the outside of the teeth defined at both sides of the tooth portion.

2. A swing actuator according to claim 1, wherein an addendum circle in said tooth portion and said round portion have the same radius, and said respective stopper is a flat surface inclined with respect to a radius of said round portion.

* * * * *